United States Patent
Talwar

[19]

[11] Patent Number: 6,064,031
[45] Date of Patent: May 16, 2000

[54] SELECTIVE METAL MATRIX COMPOSITE REINFORCEMENT BY LASER DEPOSITION

[75] Inventor: Rajesh Talwar, Chesterfield, Mo.

[73] Assignee: McDonnell Douglas Corporation, St. Louis, Mo.

[21] Appl. No.: 09/045,393

[22] Filed: Mar. 20, 1998

[51] Int. Cl.[7] ................................................. B23K 26/34
[52] U.S. Cl. .............................. 219/121.64; 219/121.66; 427/455
[58] Field of Search .................. 219/121.65, 121.66, 219/76.14, 121.13, 121.14, 121.15, 121.16, 121.17, 121.63, 121.64; 427/554, 556, 456, 455, 595, 596, 597, 454

[56] References Cited

U.S. PATENT DOCUMENTS

| 4,518,625 | 5/1985 | Westfall ................................ 219/76.14 |
| 4,615,903 | 10/1986 | Miller . |
| 4,786,566 | 11/1988 | Siemers .................................... 427/456 |
| 4,818,562 | 4/1989 | Arcella et al. . |
| 5,141,574 | 8/1992 | Takahashi et al. . |
| 5,229,165 | 7/1993 | Das et al. ................................. 427/456 |
| 5,330,587 | 7/1994 | Gavigan et al. . |
| 5,573,604 | 11/1996 | Gerdes . |
| 5,897,922 | 4/1999 | Saxena et al. ........................... 427/455 |

*Primary Examiner*—Geoffrey S. Evans
*Attorney, Agent, or Firm*—Alston & Bird, LLP

[57] ABSTRACT

The structural assemblies are selectively reinforced with metal matrix composite in the regions susceptible to mechanical failure. More specifically, a channel is machined in a structural member in an area of relatively high stress. A reinforcing member is inserted into the channel. A metal powder is deposited on and around the reinforcing member. The metal powder is irradiated by a high energy source to thereby encase the reinforcing member in a metal matrix and to consolidate the metal matrix to the interior surface of the channel. The resultant assembly is lightweight and has improved strength and stiffness at room and elevated temperatures.

10 Claims, 5 Drawing Sheets

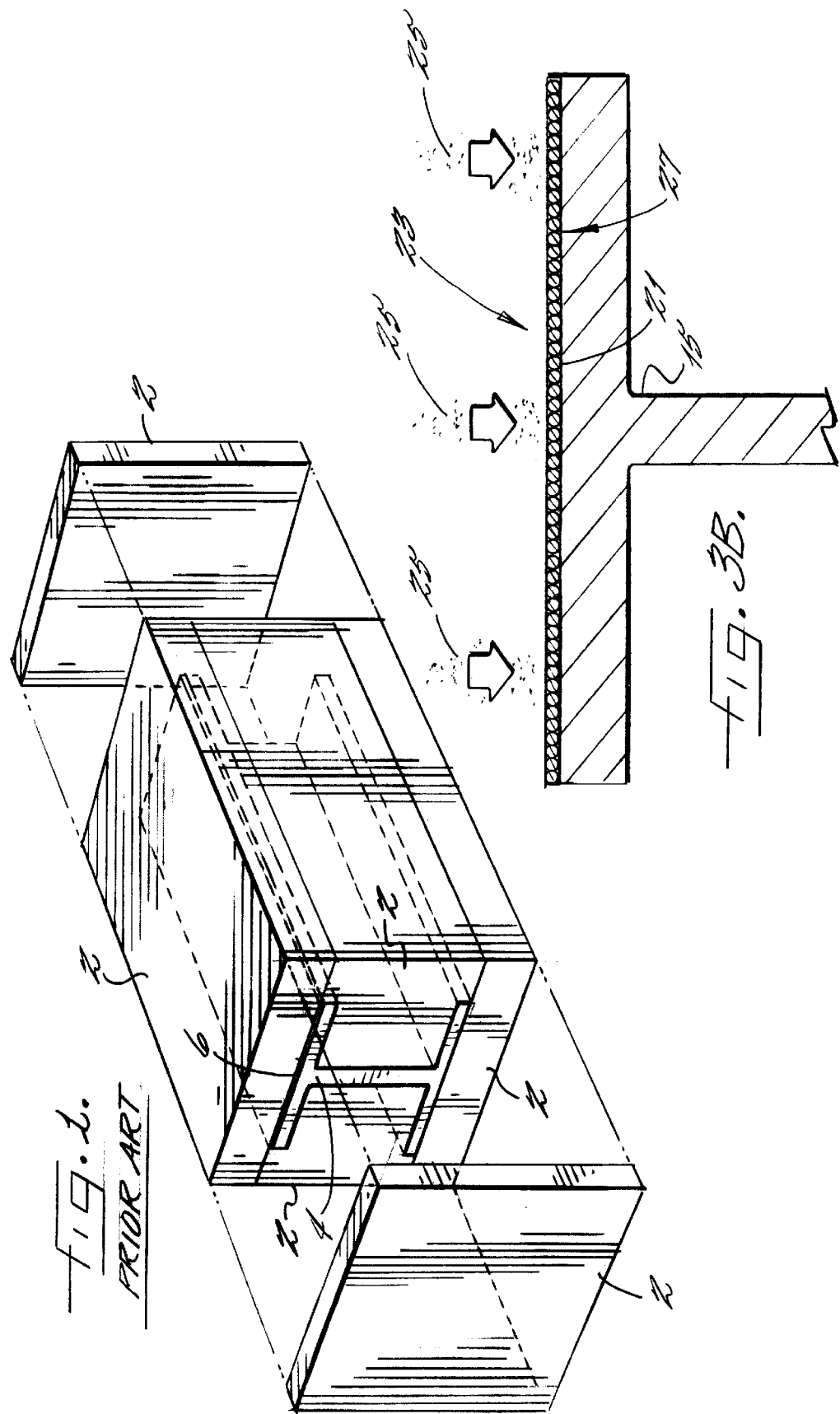

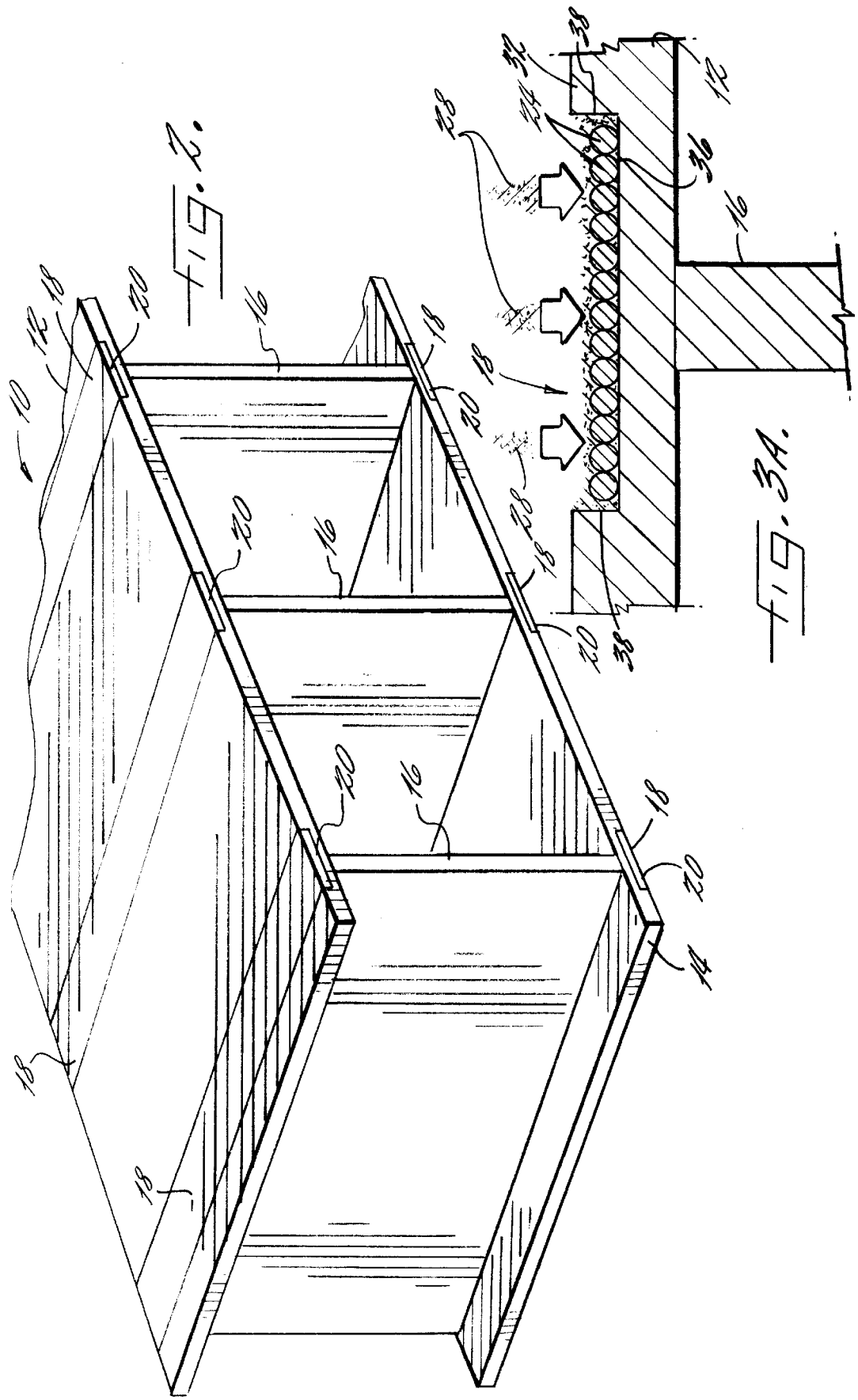

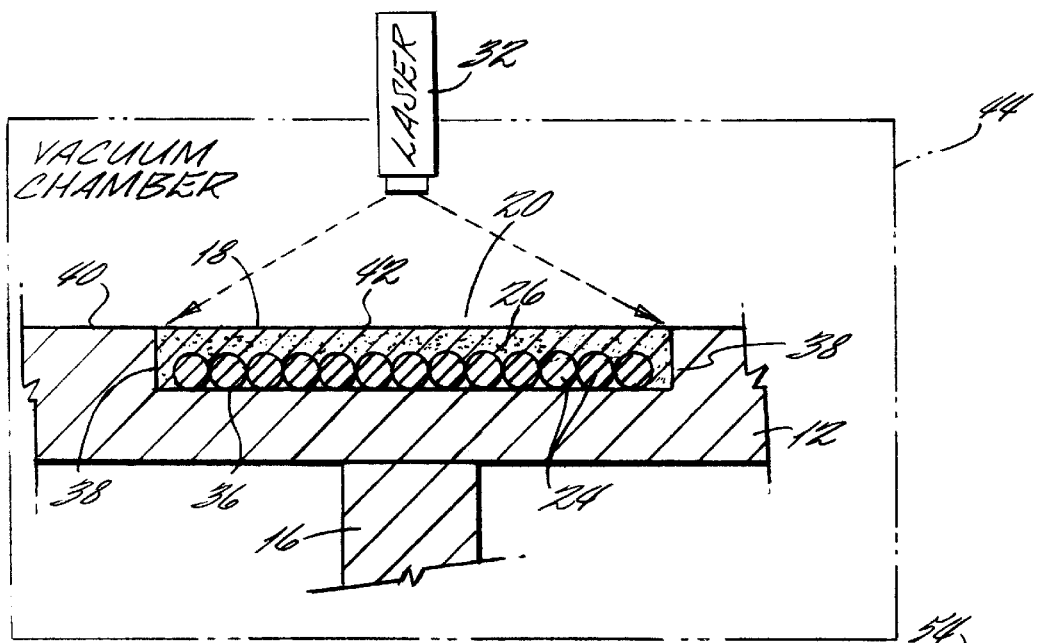
_fig. 4._
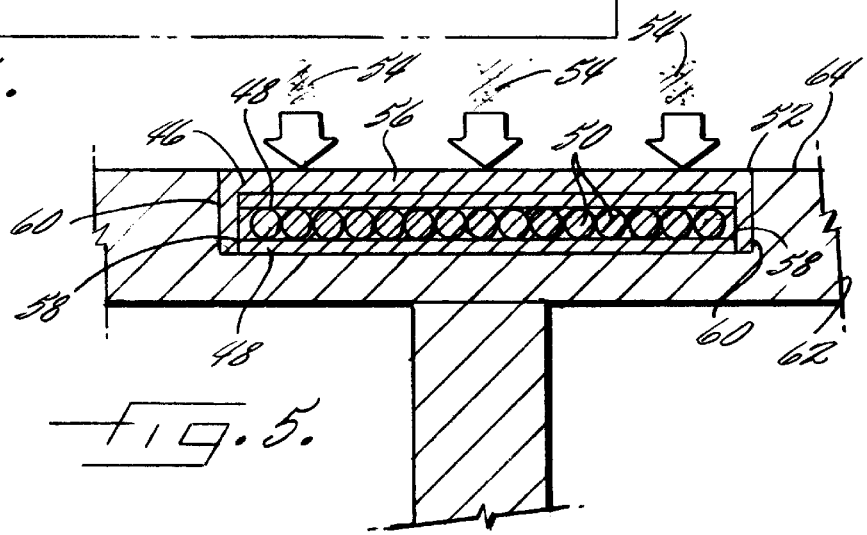
_fig. 5._
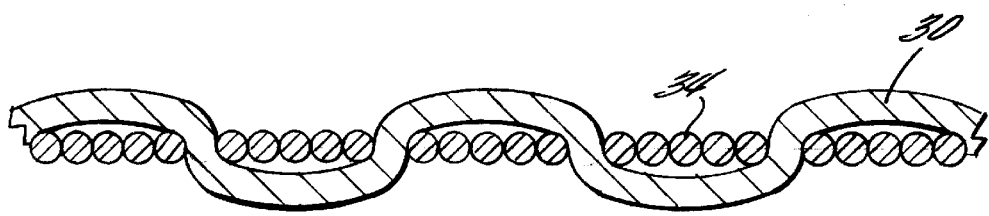
_fig. 6._

SELECTIVE METAL MATRIX COMPOSITE REINFORCEMENT BY LASER DEPOSITION

FIELD OF THE INVENTION

The present invention relates to reinforcement of structural assemblies and engine components and, more particularly, relates to selective metal matrix composite reinforcement by laser deposition.

BACKGROUND OF THE INVENTION

Conventional structural assemblies and engine components, as used in the manufacture of military and commercial aircraft and missiles, are commonly formed of lightweight, high strength materials such as aluminum alloys and titanium alloys. These assemblies can be formed using manufacturing methods such as die-forging and investment casting. Although die-forging and investment casting allow for high material utilization rates by producing near-net shape members, these methods can be prohibitive due to high nonrecurring tooling costs and long lead times for both tool design and manufacturing, especially where only a limited number of aircraft will be produced. An alternative manufacturing method used to form aircraft structural assemblies is hogout machining from plate or hand forgings. However, this method is also prohibitive, as it can result in a low material utilization rate in addition to increased machining time.

In seeking better manufacturing methods to reduce both the cost of manufacture and the weight of the structural assemblies and engine components, as well as to increase performance, the use of metal matrix composites has been proposed. Metal matrix composites consist of one or more layers or stratums of reinforcing fibers in a metal matrix. One method of constructing metal matrix composites is to alternate layers of metal foil and reinforcing fibers with the first and last layers consisting of metal foil. To consolidate layers of foil and fiber, the foil/fiber pack is canned, evacuated, and subjected to a hot isostatic pressing (HIP) process. During the HIP process, the stratified materials are placed within a HIP furnace and heated to approximately 1,700° Fahrenheit with an ambient pressure of 15,000 psi. Over time (2–4 hrs.), the metal foil becomes soft and flows between the fibers thereby consolidating the metal matrix. The same process is used to diffusion bond the metal matrix composite to the exterior surface of a structural member.

As shown in FIG. 1, during the HIP process, steel tooling 2 must be placed around the periphery of the structural member 4 and the metal matrix composite 6 to secure the composite to the member and to contain the metal matrix once it becomes soft and begins to flow. To prevent contamination of the metal, the steel tooling is welded together to form a sealed tool and the air inside the tool is evacuated prior to placing the tool in the HIP furnace. After the HIP process is completed, the steel tooling is removed using conventional machining methods. A residual layer of steel tooling typically remains around the periphery of the structural member, however, as complete removal of the steel tooling by machining may damage the metal matrix diffusion bonded to the surface of the tooling. Thus, the remaining steel tooling must be removed by chemical milling.

Metal matrix composites may also be formed using a manufacturing process known as tape casting. During tape casting, a metal powder, such as a titanium powder, is mixed with an adhesive or binder to form a slurry. The slurry is then spread over a fiber mat using a doctor blade to form a single-ply composite laminate. The composite laminate is then placed in a furnace and heated to 1,200° Fahrenheit, a temperature well below the melting point of the titanium, but sufficiently high to burn off the binder. To consolidate one or more composite laminates and/or diffusion bond the composite laminate to the exterior surface of a structural member, the composite laminate must undergo a HIP process, including the construction of steel tooling.

Metal matrix composites may also be constructed by spraying molten metal onto the reinforcing fiber. For example, a fiber mat can be secured to a metal drum which is covered with titanium foil. The drum is placed in a vacuum chamber and rotated at a predetermined angular velocity. Molten titanium, formed by melting titanium powder at a temperature of approximately 2,700° Fahrenheit, is sprayed onto the fiber mat using a plasma spray gun to form a single-ply composite laminate. As with tape casting, to consolidate one or more composite laminates and/or diffusion bond the composite laminate to the exterior surface of a structural member, the composite laminate must undergo a HIP process, including the construction of steel tooling.

In general, metal matrix composites are lightweight and provide high strength and stiffness at room and elevated temperatures. These composites are, however, expensive to produce due to the material costs of, for example, powder or foil titanium, and the high processing temperatures, press times, and expensive steel tooling of the HIP process which is necessary to consolidate the metal matrix and to diffusion bond the metal matrix composite to a structural member. As such, the use of these composites in end products also remains cost prohibitive.

Thus, there remains a need for manufacturing processes capable of producing lightweight, high strength structural assemblies and engine components for aircraft and missiles using metal matrix composites. These manufacturing processes must be cost effective in terms of both material and manufacturing costs to enable use of these innovative composites in end products.

SUMMARY OF THE INVENTION

The present invention provides a method of manufacturing a metal matrix composite lamina including the steps of positioning a stratum of reinforcing fibers on a support member and depositing a metal powder on and around the stratum of reinforcing fibers. The metal powder is then irradiated with a high energy source to consolidate the metal powder and encase the stratum of reinforcing fibers in a metal matrix. The positioning, depositing and irradiating steps may be repeated on the surface of the metal matrix composite to form a metal matrix composite laminate. The metal matrix composite laminate may be cut to a predetermined size for incorporation into a structural assembly or engine component.

The present invention also provides a method of selective metal matrix composite reinforcement of structural assemblies and engine components by laser deposition. The manufacturing steps include locating a region on a first structural member being susceptible to mechanical failure and positioning a reinforcing member on the surface of the member approximate to the region. The positioning step can further include machining the first structural member in the region to form a channel and then inserting a reinforcing member in the channel. The reinforcing member may include a stratum of reinforcing fibers, or one or more metal individual matrix composite lamina, or a metal matrix composite laminate. Metal powder is deposited on and around the reinforcing member and then irradiated with a high energy source to consolidate the metal powder and encase the reinforcing member in a metal matrix. The positioning, depositing and irradiating steps may be repeated to form a stratified metal matrix composite reinforcement. The exterior surface of the reinforcing member may be machined to provide a smooth surface relative to the exterior surface of the structural member. Selectively reinforced engine components can be similarly constructed.

The present invention also provides a reinforced structural assembly, including at least one structural member defining a channel having a lower interior surface and two opposing lateral surfaces. A reinforcing member is disposed upon the lower interior surface of the channel and is encased within a laser-consolidated metal matrix which is fusion bonded to the lower interior surface and the two opposing lateral surfaces of the channel. The reinforcing member may include a stratum of reinforcing fibers, one or more individual metal matrix composite lamina, or a metal matrix composite laminate. The stratum of reinforcing fibers may be a woven fabric. The present invention also provides for a selectively reinforced engine assembly of similar construction.

Accordingly, there has been provided selectively reinforced engine and structural assemblies and associated methods of manufacture allowing for the efficient construction of aircraft structural assemblies and engine components using metal matrix composites. These assemblies and components will be lightweight and provide high strength and stiffness at room and elevated temperatures without the costs associated with manufacturing the metal matrix composites using expensive tooling with a hot isostatic pressing process.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein:

FIG. 1 is a perspective view showing a structural assembly encased in steel tooling as known in the art;

FIG. 2 is a perspective view of a selectively reinforced structural assembly according to one embodiment of the present invention;

FIG. 3A is a fragmentary cross-sectional view showing reinforcement of a channel machined in a structural member of the structural assembly of FIG. 1;

FIG. 3B is a fragmentary cross-sectional view showing reinforcement of the exterior surface of a structural member;

FIG. 4 is a fragmentary cross-sectional view showing a laser consolidating metal powder to form a metal matrix encompassing a stratum of reinforcing fibers and joining the metal matrix to the interior surface of the channel of the structural assembly of FIG. 2;

FIG. 5 is a fragmentary cross-sectional view showing the selective reinforcement of a structural member with a prefabricated metal matrix composite lamina and metal powder;

FIG. 6 is a fragmentary cross-sectional view showing woven reinforcing fiber as used to selectively reinforce structural assemblies and engine components;

DETAILED DESCRIPTION OF THE PREFERRED EMBODIMENTS

Figure 7:
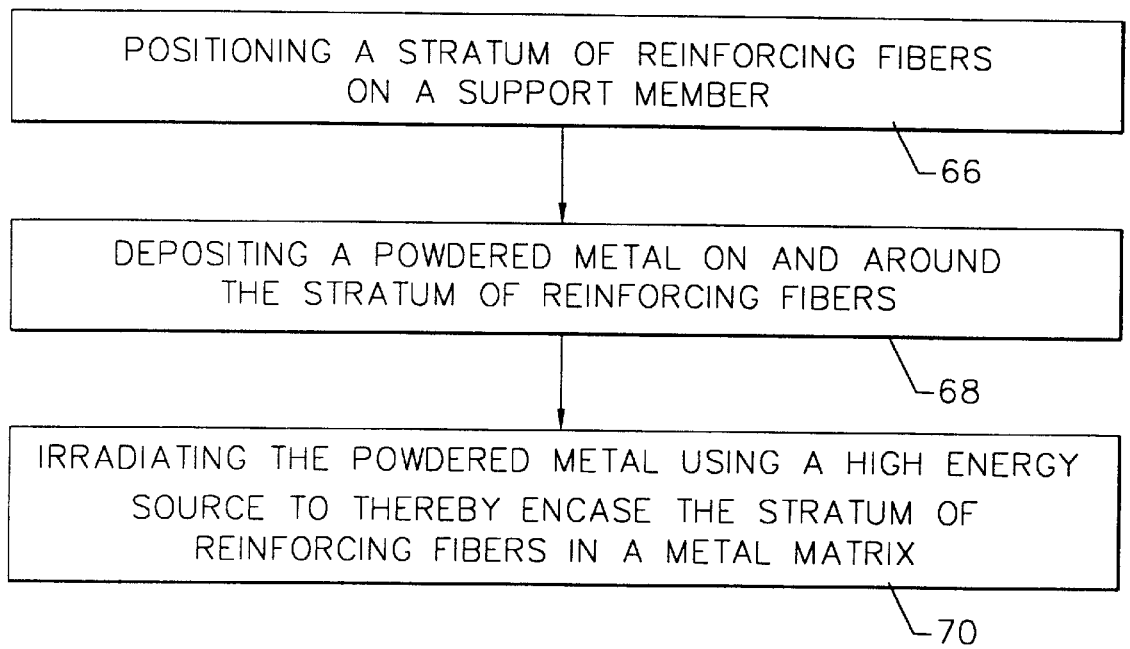
FIG. 7 is a flow chart showing the steps for manufacturing a pre-manufactured metal matrix composite lamina.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings. In the drawings, like numbers refer to like elements throughout.

Referring to the drawings and, in particular to FIG. 2, there is shown a selectively reinforced structural assembly 10 constructed according to one embodiment of the present invention. The structural assembly has two outer structural members 12,14 and a plurality of intermediate structural members 16. It should be appreciated, however, that structural assemblies and engine components may be constructed in a variety of configurations and different geometries.

The structural assembly shown in FIG. 2 is merely representative of one such configuration.

The structural members 12,14,16 are commonly formed of lightweight, high strength metal alloys such as aluminum or titanium alloys and may be machined, and then welded together or joined using mechanical fasteners. These assemblies may be constructed using conventional manufacturing methods as are well known in the art. During operation of the aircraft or missile, the structural assemblies and engine components will be subjected to many cycles of non-uniform stress, including tensile, compressive, and shear stresses. The regions of the structural assemblies and engine components that are susceptible to mechanical failure due to relatively high operational stresses may be identified using conventional stress analysis techniques which are well known in the art. Advantageously, these high stress regions, once identified, may be selectively reinforced, according to the present invention, using lightweight, high strength metal matrix composites without the expense typically associated with the hot isostatic pressing (HIP) process, including the time and expense associated with fabricating the steel tooling, welding the tooling to form a sealed tool, evacuating the tool to prevent contamination of the metal matrix during the HIP process, and removing the steel tooling using conventional machining methods and chemical milling.

As shown in FIG. 3a, channels 18 of predetermined width and depth are selectively machined in the high stress regions. The channels have a lower surface 36 and opposed lateral surfaces 38 and may be formed using known manufacturing means such as a CNC milling machine. The dimensions of each channel are dependent upon the anticipated design loads and the mechanical properties of the metal matrix composite reinforcement 20. Preferably, the channels have a depth of at least 0.0625 inches.

As shown in FIGS. 3a and 4, each channel 18 is reinforced with a reinforcing member constructed of a metal matrix composite 20 having at least one stratum of reinforcing fibers 24 encased within a metal matrix 26. Preferably, the stratum of reinforcing fibers has a length and width slightly less than that of the corresponding channel to allow the powdered metal to settle around the periphery of the reinforcing fibers.

The region susceptible to mechanical failure can also include the entire exterior surface 21 of the structural member 15. As shown in FIG. 3b, this region is selectively reinforced by positioning a reinforcing member 23 on the surface of the structural member and then covering the reinforcing member with a powdered metal 25. The reinforcing member has at least one stratum of reinforcing fibers 27 encased within a metal matrix. Preferably, the stratum of reinforcing fibers has length and width slightly less than that of the surface of the structural member to allow the powdered metal to settle around the periphery of the reinforcing fibers.

Preferably, the powdered metal is pure or pre-alloyed titanium and the reinforcing fibers are constructed of 0.0056 inch diameter silicon carbide fibers. Additionally, as shown in FIG. 6, the reinforcing fibers 34 may be woven into a loose fabric using a titanium ribbon or thread 30.

As shown in FIG. 4, a high energy source, for example a laser 32 or an electron gun (not shown), is then used to consolidate the titanium powder 28, thereby encasing the stratum of reinforcing fibers 24 in a metal matrix 26 upon solidification of the titanium. As the titanium solidifies, the metal matrix will also fuse with the lower surface 36 and interior surfaces 38 of the channel 18, or the exterior surface 21 of the structural member 15, as shown in FIG. 3b. Advantageously, the high energy source replaces the HIP process conventionally used for consolidating the metal matrix and diffusion bonding the metal matrix composite to the structural assembly or engine component. A laser is the preferred high energy source as it does not require a vacuum chamber. Although any laser having sufficient energy to consolidate the powdered metal may be used, including both continuous wave and pulse lasers, the laser is preferably a 14 kilowatt-continuous-wave $CO_2$ laser, as it produces enough energy to melt most metals.

Preferably, when consolidating the powdered metal, the energy emitted from the high energy source is swept over the entire surface of the metal powder either moving the structural assembly relative to the high energy source, or alternatively, by moving the high energy source relative to the structural assembly. In a preferred embodiment (not shown), a computing means is provided, such as a computer or controller operating under software control. The computing means is in electrical communication with an electric pneumatic, or hydraulic motor and assembly, as is well known in the art, for automatically moving either the high energy source or the structural or engine assembly relative to the other.

The consolidation of the powdered titanium must be carried out in an inert atmosphere or in a vacuum chamber 44 in order to prevent contamination of the powdered titanium. For example, the laser deposition process may be carried out in a sealed chamber containing argon. See U.S. Pat. No. 4,818,562 to Arcella et al. for a general discussion of laser casting using powdered titanium, the contents of which are incorporated herein by reference.

The metal matrix composite 20 in the channel 18 shown in FIG. 4 may be stratified by inserting additional stratums of reinforcing fibers into the channel. Each stratum is covered with metal powder 28 that is consolidated using a high energy source to form a metal matrix. The metal matrix of each additional layer fuses with the interior lateral surfaces 38 of the channel as well as the metal matrix 26 of the underlying composite. This process may be repeated until the exterior surface of the stratified metal matrix composite is substantially level or flush with the exterior surface 40 of the structural member 12. Whether constructed of a single-ply or stratified, the exterior surface 42 of the metal matrix composite 20 may then be machined to provide a smooth and even surface relative to the exterior surface 40 of the structural member 12. If not yet fully flush, the channel may be filled with powdered metal which can be fused to the existing metal matrix and interior surface of the channel and then machined to provide a smooth surface.

Similarly, the metal matrix composite on the exterior surface 21 of the structural member 15 shown in FIG. 3b may also be stratified by positioning additional stratums of reinforcing fibers over the underlying metal matrix composite lamina and covering each stratum with metal powder 25. The metal powder is consolidated using a high energy source to form a metal matrix. The metal matrix of each additional layer fuses with the metal matrix of the underlying composite. This process may be repeated until the desired thickness of metal matrix composite is obtained. Whether constructed of a single-ply or stratified, the exterior surfaces of the metal matrix composite may be machined to provide smooth and even surfaces relative to the exterior surface 41 of the structural member 15. If not yet fully flush, additional powdered metal can be fused to the existing metal matrix and machined to provide a smooth surface.

The present invention also includes the construction of pre-manufacture metal matrix composite lamina or laminates for use with either the HIP process or to selectively reinforce a structural member or engine component. Referring to FIG. 7, there is illustrated the operations performed to manufacture a metal matrix composite lamina according to one embodiment of the present invention. The first step includes positioning a stratum of reinforcing fibers on a support member. See block 66. The second step includes depositing a powdered metal on and around the stratum of reinforcing fibers. See block 68. The powdered metal is then irradiated with a high energy source such as a laser or electron gun to thereby consolidate the metal powder and encase the stratum of reinforcing fibers within a metal matrix. See block 70. A pre-manufactured metal matrix composite laminate may be constructed by repeating the positioning, depositing, and irradiating steps of FIG. 7.

In another embodiment of the present invention, as shown in FIG. 5, a single-ply metal matrix composite lamina 46 having a metal matrix 48 and a stratum of reinforcing fibers 50 is used to selectively reinforce a structural assembly 62. The single-ply metal matrix composite is pre-manufactured using either laser deposition or the HIP process and then machined to the desired dimensions such that its width and length are slightly less than the dimensions of the channel 52 in structural member. A powdered metal 54 is then placed in the channel, on and around the exterior surface 56 of the composite lamina thereby filling the spaces between the lateral sides 58 of the lamina and the interior surfaces 60 of the channel. The metal matrix composite lamina is preferably constructed of 0.0056 inch diameter silicon carbide reinforcing fibers in a titanium matrix forming a lamina having a thickness of approximately 0.008 inches. The composite lamina is secured to the interior surfaces of the channel by consolidating the powdered titanium to the metal matrix of the lamina and to the interior surfaces of the channel using a high energy source (not shown). A pre-manufactured metal matrix composite lamina may also be used to selectively reinforce the entire exterior surface of the structural member or engine component (not shown).

The metal matrix composite lamina may be stratified by adding additional metal matrix composite lamina, covering each lamina with metal powder and fusing the metal powder with a high energy source. This process may be repeated until the exterior surface of the stratified metal matrix composite is substantially level with the exterior surface 64 of the structural member 62 or the desired thickness of composite is obtained. For example, a stratified metal matrix composite having a thickness of approximately 0.064 inches can be obtained by layering eight plies of 0.008 inch composite lamina. Once secured to the structural member or the engine component, the exterior surface or surfaces of the metal matrix composite lamina may be machined to provide a smooth and even surface relative to the exterior surface of the structural assembly or engine component.

In an alternate embodiment, (now shown) a pre-manufactured metal matrix composite laminate of desired thickness may be used to selectively reinforce a structural assembly. The metal matrix composite laminate may be inserted into a channel, as shown in FIG. 3A, or positioned on the exterior surface of a structural assembly, as shown in FIG. 3B. A metal powder is then placed on and around the composite laminate and consolidated using a high energy source to secure the composite laminate to the structural assembly. Depending on the thickness of the laminate, the metal matrix of the laminate may not fully diffusion bond to the surface of the structural assembly. Accordingly, it may be necessary to subject the structural assembly and composite laminate to a hot isostatic pressing to assure a high strength diffusion bond between the metal matrix of the composite laminate and the surface of the structural assembly. However, the construction of steel tooling is not required as prior to the HIP process both the pre-manufactured metal matrix composite laminate and the surrounding titanium matrix powder are fully consolidated. The HIP process is only necessary to diffusion bond the laminate to the structural members. Fixturing may be utilized to prevent distortion of the structural assembly during the HIP process. Fixturing consists of two or more steel plates secured around the structural assembly, but unlike steel tooling, the fixture does not typically require welding or evacuating. Once the composite laminate is secured to the structural member or engine component, the exterior surface or surfaces of the metal matrix composite laminate may be machined to provide a smooth and even surface relative to the exterior surface or surfaces of the structural assembly or engine component.

The mechanical properties of the metal matrix composite reinforcement will depend upon the material properties of the metal matrix and reinforcing fibers. Where the composite is stratified the mechanical properties will also depend upon the number of stratums of reinforcing fiber in the composite and on whether the fiber direction in the composite is unidirectional, orthogonal or random. Advantageously, the fiber direction may be oriented between 0°–90° in a stratified composite laminate in order to vary the mechanical properties of the composite. The metal matrix may be formed using a variety of metals, for example aluminum, magnesium, nickel based super alloys, or titanium. Similarly, the reinforcing fibers may be constructed of a variety of materials, for example, aluminum oxide, silicon carbide, boron, beryllium and tungsten.

Advantageously, the selective reinforcement of structural assemblies, as taught by the present invention, would be useful in the ribs of highly loaded skins, spar caps, bulkhead and frame caps. Since metal matrix composites retain their strength and stiffness at room and elevated temperatures, the selective reinforcement can also be used in hot areas of the airframe. Although the above description focuses on structural assemblies, in addition to the airframe, selective metal matrix reinforcement can also be implemented in landing gear, hydraulic actuator components, engine shafts, fan blades, fan frames and actuators links.

Figure 8:
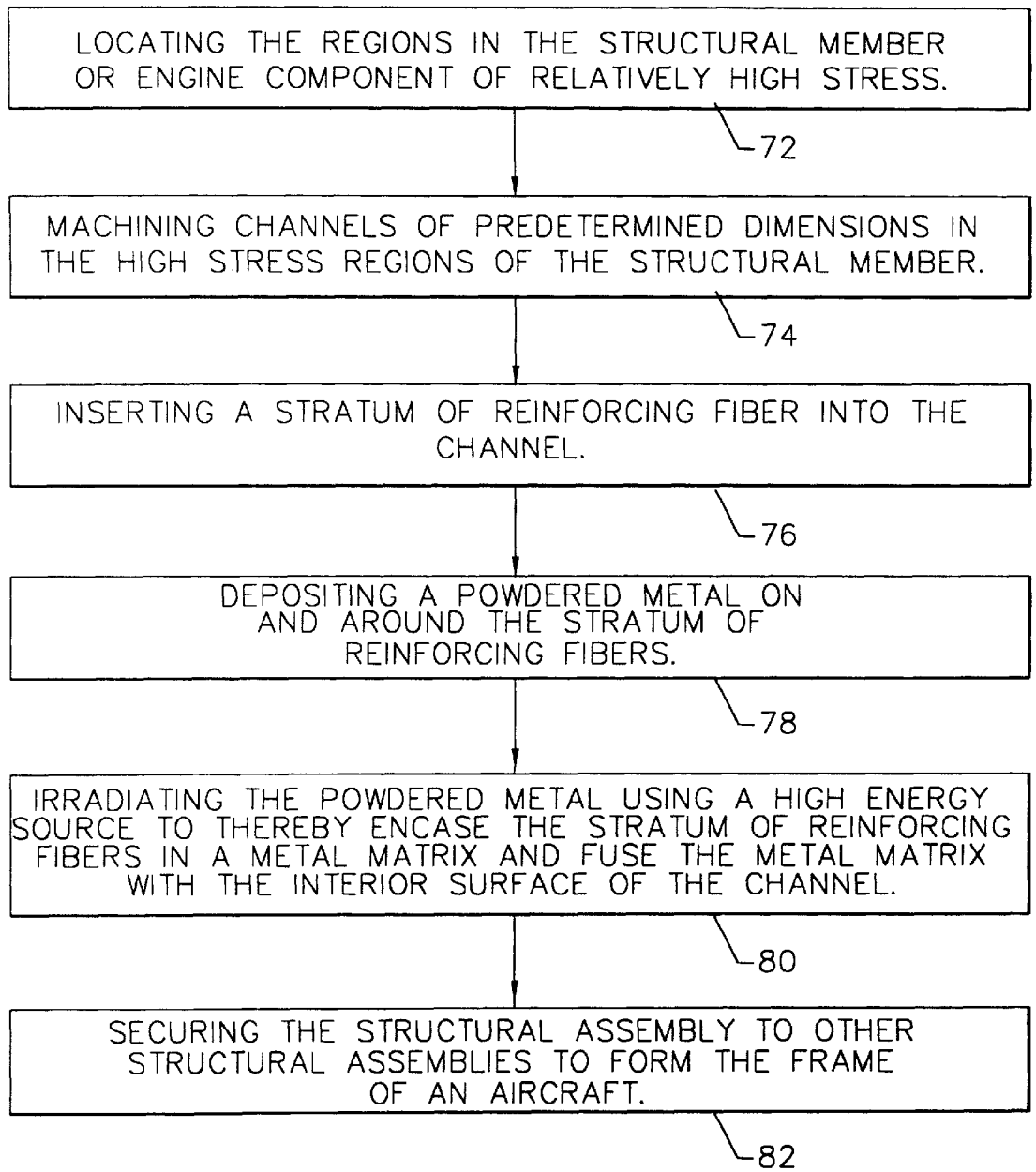
FIG. 8 is a flow chart showing the steps for manufacturing the selectively reinforced structural assembly of FIG. 2.

Referring now to FIG. 8, there is illustrated the operations performed to manufacture a structural assembly or engine component according to one embodiment of the present invention. The first step includes locating the regions of relatively high stress in the structural member or engine component. See block 72. The second step includes machining channels, each having predetermined dimensions, in the high stress regions of the structural member or engine component. See block 74. Next, a stratum of reinforcing fiber is inserted into the channel. See block 76. A powdered metal is then deposited on and around the stratum of reinforcing fiber within the channel. See block 78.

The metal powder is then irradiated with a high energy source such as a laser or electron gun to thereby consolidate the metal powder and encase the stratum of reinforcing fibers within a metal matrix and joining the metal matrix to the interior surfaces of the channel. See block 80. The metal matrix composite may be stratified by repeating the inserting, depositing, and irradiating steps. Thereafter, the structural assembly is secured to other structural assemblies to form the frame of an aircraft. See block 82.

While particular embodiments of the invention have been described, it will be understood, of course, the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

That which is claimed:

1. A method of manufacturing a selectively reinforced structural assembly, comprising the steps of:

locating a region on a first structural member being susceptible to mechanical failure;

positioning a reinforcing member on the surface of the structural member adjacent to the region;

depositing a metal powder on and around the reinforcing member; and irradiating the metal powder with a high energy source to thereby consolidate the metal powder and encase the reinforcing member in a metal matrix.

2. A method according to claim 1 wherein said positioning step further comprises:

machining the first structural member in the region to form a channel; and inserting a reinforcing member in the channel.

3. A method according to claim 2 further comprising repeating the positioning, depositing and irradiating steps to thereby form a stratified metal matrix composite reinforcement.

4. A method according to claim 2 further comprising the step of machining the exterior surface of the metal matrix so that the exterior surface of the metal matrix is level with the exterior surface of the structural member.

5. A method according to claim 4 further comprising the step of securing the selectively reinforced structural assembly to other structural assemblies to form the frame of an aircraft.

6. A method of manufacturing a metal matrix composite lamina, comprising the steps of:

positioning a stratum of reinforcing fibers on a support member;

depositing a metal powder on and around the stratum of reinforcing fibers; and thereafter irradiating the metal powder with a high energy source to thereby consolidate the metal powder and encase the stratum of reinforcing fibers in a metal matrix.

7. A method according to claim 6 further comprising repeating the positioning, depositing and irradiating steps on the surface of a metal matrix composite to thereby form a metal matrix composite laminate.

8. A method according to claim 7 further comprising the steps of cutting the metal matrix composite laminate to a predetermined size.

9. A method of manufacturing a metal matrix composite lamina, comprising the steps of:

positioning a stratum of reinforcing fibers on a support member;

depositing a metal powder on and around the stratum of reinforcing fibers;

irradiating the metal powder with a high energy source to thereby consolidate the metal powder and encase the stratum of reinforcing fibers in a metal matrix; and repeating the positioning, depositing and irradiating steps on the surface of a metal matrix composite to thereby form a metal matrix composite laminate.

10. A method according to claim 9 further comprising the step of cutting the metal matrix composite laminate to a predetermined size.

* * * * *